(12) United States Patent
Malacarne et al.

(10) Patent No.: US 8,304,487 B2
(45) Date of Patent: Nov. 6, 2012

(54) CONCENTRATES OF ADDITIVES FOR USE IN THE PROCESSING OF POLYOLEFINS

(75) Inventors: Fulvio Malacarne, Seveso (IT); Franco Sartori, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 1745 days.

(21) Appl. No.: 10/566,897

(22) PCT Filed: Jul. 29, 2004

(86) PCT No.: PCT/EP2004/008555
§ 371 (c)(1), (2), (4) Date: Feb. 1, 2006

(87) PCT Pub. No.: WO2005/014714
PCT Pub. Date: Feb. 17, 2005

(65) Prior Publication Data
US 2007/0055004 A1    Mar. 8, 2007

(30) Foreign Application Priority Data
Aug. 1, 2003    (IT) .................................. MI03A1579

(51) Int. Cl.
*C08K 5/00*    (2006.01)

(52) U.S. Cl. ...................................................... 524/515
(58) Field of Classification Search .................. 524/515; 525/240; 526/348.4
See application file for complete search history.

(56) References Cited

U.S. PATENT DOCUMENTS

| | | | | |
|---|---|---|---|---|
| 3,455,871 | A | | 7/1969 | Coover, Jr. et al. ............. 260/41 |
| 4,078,020 | A | * | 3/1978 | Rose et al. ..................... 525/240 |
| 4,960,820 | A | | 10/1990 | Hwo .............................. 524/528 |
| 6,677,395 | B1 | * | 1/2004 | Dang et al. ..................... 524/432 |
| 2003/0050378 | A1 | | 3/2003 | Blanchard et al. ............ 524/423 |

FOREIGN PATENT DOCUMENTS

| | | |
|---|---|---|
| EP | 0365400 | 4/1990 |
| GB | 1080745 | 8/1967 |
| JP | 05179009 | 7/1993 |
| JP | 2000178361 | 6/2000 |
| WO | 2004044048 | 5/2004 |

* cited by examiner

*Primary Examiner* — Robert D. Harlan
(74) *Attorney, Agent, or Firm* — Dilworth IP LLC

(57) ABSTRACT

Concentrates comprising a blend of polybutene-1 and polypropylene and up to 60 wt. % of one or more additives, in particular suitable for use in processes of bulk coloring and spinning of polyolefins.

22 Claims, 1 Drawing Sheet

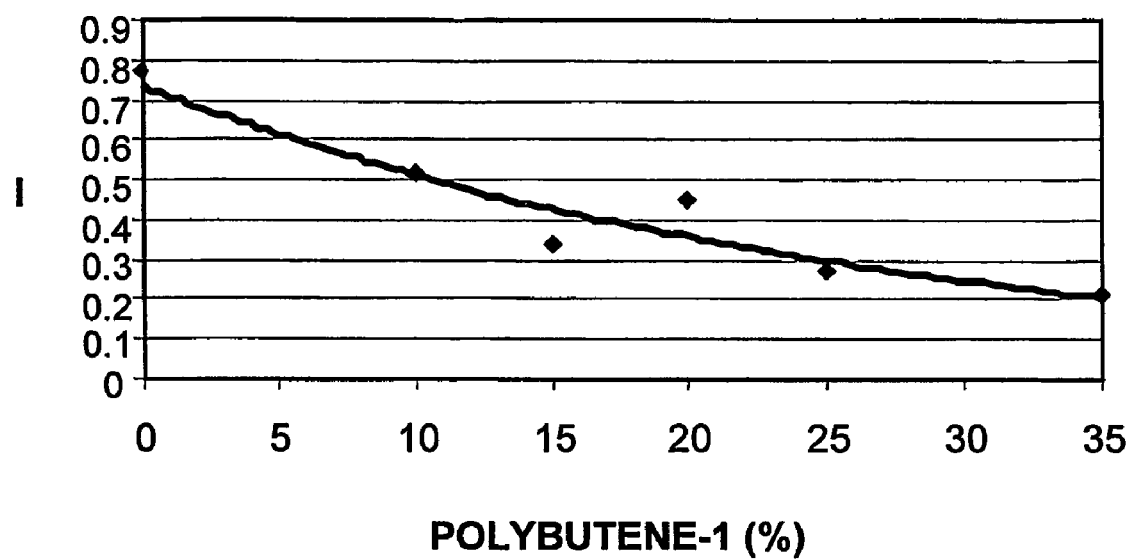

CONCENTRATES OF ADDITIVES FOR USE IN THE PROCESSING OF POLYOLEFINS

The present invention relates to concentrates comprising a mixture of polybutene-1 and polypropylene and one or more additives, particularly suitable for the bulk colouring of the polyolefins, preferably of polypropylene.

The various types of processing to which the polyolefins are submitted include injection or blow moulding, and spinning. Particularly in the production of fibres of polyolefin resins, which is mainly carried out continuously, the colouring stage is a rather critical stage at present: on the one hand because of the ever smaller cross-section of the fibres, defined by the denier or diameter, according to a requirement of the fibre producers themselves, and on the other hand because of the high speeds reached in today's spinning processes.

The concentrates, better known as "masterbatches", constitute the product that is added to the various polyolefins for the introduction of additives. The masterbatch thus generally consists of a mixture of one or more pigments/colorants, fillers or other additives dispersed and/or distributed at high concentrations in a polymeric carrier. Poor dispersion of the pigment in the masterbatch and hence of the masterbatch in the resin mass to be coloured can give rise to unevenness in the resulting coloration and, in the case of fibre production, to low production yields owing to frequent breakages of the filaments caused by the pigment, which is not well disaggregated.

In the specific case of bulk colouring of polypropylene, which presents the problems outlined above, the commercially available formulations envisage dispersion of the pigment in the carrier, which can be the same polypropylene or alternatively polyethylene, by using waxes and dispersants such as stearates or paraffins. The use of dispersants is necessary because the polyolefins, on account of their apolar nature, are characterized by very low affinity for (polar) organic pigments. However, the use of waxes (stearates and/or paraffins), though unavoidable, is a disturbing element since for certain applications (e.g. extrusion of fibres) their presence can be detrimental to the quality of the finished product.

It is known that a critical parameter for the dispersion of the pigment in a carrier is the degree of crystallinity of the latter. In fact, the colorant or pigment is unable to get between the lamellae of the crystal zones, but is inserted more easily in the amorphous zones of the carrier.

In the specific case of the process of extrusion of polyolefin fibres, it is known in addition that the elongation stress is relieved in the amorphous zones during the said process: stretching of the chains in the zones that are not stiffened in a crystalline conformation permits spinning of the polymer to a degree that is proportional to the crystalline fraction of the polymer. The excess stress, i.e. that to which the amorphous zones are unable to respond, is relieved on the crystalline fraction of the polymer itself, which is thus of fundamental importance for the strength of the material, especially in the critical conditions of existing spinning processes.

For example, document JP 2000178361 describes masterbatches for colouring plastics containing polypropylene, pigment and a polyethylenic wax.

Document JP 5179009 describes a modified thermoplastic masterbatch preparation with good dispersibility containing a thermoplastic, such as polyethylene granules, a liquid modifier, such as polybutene, and a second thermoplastic such as low-density polyethylene.

It is therefore clear that selection of the carrier for the masterbatch is essential to achieve effective dispersion of the additive.

As noted above, polypropylene is also known as a carrier and in this case, to avoid considerable problems in the processes of colouring and spinning, it is necessary to use a semicrystalline polypropylene with a sufficiently high degree of hot fluidity to permit the pigment to be incorporated easily in the molten mass, but capable of withstanding high stretching forces during the spinning process.

It is clear that the ratio of crystalline to amorphous fraction of the polymer acting as carrier is an essential element in the formulation of the masterbatches for polymer fibres. In the specific case of spinning, it is further evident that numerous factors contribute to the production of a homogeneous coloured filament and that the process requirements and requirements on filament diameter (denier) mean that manufacturers must always carefully evaluate and determine the conditions of the coloration stage.

Therefore a polymeric carrier is required that could be used for the production of masterbatches for use in the bulk colouring of polyolefins in processes involving colorants and/or pigments that are difficult to disaggregate and disperse and which, particularly in the fibre extrusion process, has the critical aspects mentioned above.

The aim of the present invention is therefore to provide a carrier and hence a masterbatch for adding additives to polyolefins, whose efficacy is not greatly affected by the variability of the process conditions.

Another aim of the invention is to provide a carrier and hence a masterbatch that can be used in spinning processes for the production of continuous yarn of low denier and that therefore promotes the "dispersion" and the "dispersibility" of the pigment, where the first term means the ability of the colorant and/or pigment to disaggregate into microparticles and disperse homogeneously in the carrier and the second term means the ability of the masterbatch containing the colorant and/or pigment, when incorporated at high concentration, to disperse homogeneously in the bulk that is to be coloured, and hence the ability to disperse the colorant and/or pigment in the said bulk.

The aforementioned aims have been achieved by using a composition comprising a polymer of 1-butene (called "polybutene-1" for short) and a polymer of propylene ("polypropylene"), as defined in the claims.

Document U.S. Pat. No. 3,455,871 describes the use of homo- and copolymers of 1-butene as carrier for promoting the dispersion of additives in the process of colouring of olefinic polymers. However, blends with polypropylene are not cited in that document.

Furthermore, document U.S. Pat. No. 4,960,820 describes a polymer composition comprising a mixture of isotactic polybutene-1 (having a melt index between 100 and 1000 and added in an amount not greater than 10 wt. %), of polypropylene in an amount equal to at least 90 wt. % and of an additive present at a concentration between 0.1 and 1 wt. %, that can be used for the production of films characterized by good optical properties and good processability, as well as fibres. However, that document does not describe the preparation and use of masterbatches for dispersing the additives.

The Applicant found, surprisingly, that by using, as carrier for the concentrates, a composition comprising polybutene-1 and polypropylene, in which the polybutene-1 is preferably present in amounts greater than or equal to 10 wt. %, the dispersion and the dispersibility of the additives in the stage of blending with polyolefins are further promoted.

In particular, the present invention facilitates the colouring stage in a process of extrusion of polypropylene fibres, so that the pigment will not fail to be dispersed in the carrier and thus clog the filter positioned downstream of the extrusion head during the process of spinning of the polymer, causing a considerable increase in pressure.

Without wishing to be linked to any theory, the possibility of using the binary mixture arose from the observation that polybutene-1 has structural characteristics similar to those of polypropylene.

It was found that any ratio whatever between polybutene-1 and polypropylene in the carrier mixture gives an at least slight dispersibility of the pigment, as will be shown later, referring to the appended drawing.

More particularly, the invention relates to the use of a carrier composition for the dispersion and dispersibility of the pigment comprising from 10% to 35% by weight of polybutene-1 and from 90% to 65% by weight of polypropylene. Even more preferably, the invention relates to the use of a carrier composition comprising 30-35% of polybutene-1 and 70-65% of polypropylene.

In the case of the process of spinning of polypropylene, the invention relates to the use of a carrier comprising 25-35% by weight of polybutene-1 and 75-65% by weight of polypropylene, since it was found that for percentages below 25% of polybutene-1 the masterbatch obtained could not be regarded as a good product for fibres, while for concentrations above 35% the increase in dispersibility of the pigment was negligible above all because it did not make up for the costs of the polybutene-1.

The invention is suitable for the dispersion and dispersibility of any additive, without limitation as to the chemical category to which it belongs.

It was found that the melt flow rate of polybutene-1 is a factor that can help to give good dispersion of the additive and it is assumed that high values of the melt flow rate give better dispersion of the additive in the carrier. Preferably, a melt flow rate from about 100 to 1000 g/10 min, more preferably from 100 to 400 g/10 min, proved advantageous for polybutene-1 (measured at 190° C./2.16 kg according to ASTM D1238, condition E).

The polybutene-1 preferably employed for the concentrates of the present invention is a linear homopolymer that is semicrystalline and highly isotactic (having in particular an isotacticity from 96 to 99%, measured both as mmmm pentads/total pentads using NMR and as quantity by weight of matter soluble in xylene at 0° C.), obtained by polymerization of butene-1 with a stereospecific catalyst, and the binary mixture with polypropylene, as already noted, is described in the literature. In the case when a copolymer of butene-1 is used, the isotacticity index can be expressed as matter that is insoluble in xylene, still at 0° C., and is preferably greater than or equal to 60%. Preferably the polybutene-1 used in the carriers of the present invention has a melting point of crystalline form 2 (the first to form, being favoured kinetically) from 81 to 109° C.

Suitable polymers of butene-1 are both the homopolymers and the copolymers preferably containing up to 30 mol. % of olefinic comonomers (in particular ethylene and alpha-olefins containing from 5 to 8 carbon atoms). These polymers can be obtained, for example, by low-pressure Ziegler-Natta polymerization of butene-1, for example by polymerizing butene-1 (and any comonomers) with catalysts based on $TiCl_3$, or halogenated compounds of titanium supported on magnesium chloride, and suitable co-catalysts (in particular alkyl compounds of aluminium). High values of melt flow rate are obtained by successive treatment of the polymer with peroxides. The polymers of butene-1 used in the carriers of the present invention are solid polymers at room temperature.

The PB0800 polybutene-1 (sold by Basell) is particularly suitable for use in the concentrates of the present invention. This is a homopolymer having a melt flow rate of 200 g/10 min at 190° C./2.16 kg.

The typical physical properties of this polymer are presented in the following table:

| PHYSICOCHEMICAL PROPERTIES | ASTM METHOD | VALUE |
|---|---|---|
| Melt flow rate | D1238 | 200 g/10 min |
| Density | D1505 | 0.915 g/cm$^3$ |
| Tensile stress at yield | D638 | 13.8 MPa |
| Tensile stress at break | D638 | 29.0 MPa |
| Elongation at break | D638 | 350% |
| Elastic modulus | D638 | 241 MPa |
| Shore hardness | D2240 | 55 |
| Embrittlement temperature | D746 | −18° C. |
| Melting range | DSC | 124-126° C. |
| Vicat softening point | D1525 | 116° C. |
| Thermal conductivity | C177 | 0.00043 cal/s/cm/K |

The propylene polymers that can be used in the concentrates of the present invention can be isotactic crystalline homopolymers or copolymers of propylene, without distinction. Among the copolymers, the isotactic crystalline copolymers of propylene with ethylene and/or $CH_2$=CHR alpha-olefins in which R is an alkyl radical with 2-8 carbon atoms (for example butene-1, hexene-1, octene-1), containing more than 85 wt. % of propylene, are particularly suitable. The isotacticity index of the aforesaid polymers of propylene is preferably greater than or equal to 90, measured as the fraction that is insoluble in boiling heptane or in xylene at room temperature (approx. 25° C.).

The terms "additives", "pigments" and "fillers" are commonly employed in this field for indicating the substances that are added to polymers during processing.

In particular the term "pigments" includes organic and inorganic substances, such as carbon black, titanium dioxide ($TiO_2$), chromium oxides, and phthalocyanines.

The term "fillers" includes substances such as talc, carbonates and micas.

Both the pigments and the fillers are specific examples included within the general definition of additives.

Apart from pigments and fillers, the term "additives" also generally includes the categories of substances listed below.
1) Stabilizers.
   Examples of stabilizers are:
   A) antiacids, for example stearates, carbonates and synthetic hydrotalcite;
   B) light stabilizers, for example UV absorbers, such as benzophenones, benzotriazoles, carbon black; "quenchers", generally selected from the organic complexes of nickel; HALS (Hindered Amine Light Stabilizers);
   C) antioxidants, for example phenols, phosphites, phosphonites and compounds that are synergistic with respect to the antioxidants, for example thioesters and thioethers.
2) Process Coadjuvants and Modifiers.
   Examples of the aforesaid additives are:
   D) nucleating agents, for example dibenzylidenesorbitol, organic carboxylic acids and their salts, such as adipic acid, benzoic acid, sodium benzoate and adipate;
   E) slip agents, for example erucamide, oleamide;

F) antiblocking agents, for example silicon dioxide (SiO$_2$), synthetic zeolites;

G) lubricants and antistatic agents, for example glyceryl-monostearate, waxes and paraffin oils, ethoxylated amines;

H) modifiers of molecular weight and rheological properties, for example peroxides.

In particular, the concentrates of the present invention prove especially suitable for the dispersion of solid substances in polyolefins. Therefore concentrates in which the additives are solid at room temperature are preferred.

The additives are preferably present in the concentrates of the present invention in amounts from 5 to 60 wt. %, more preferably from 5 to 50 wt. %, and especially from 20 to 40 wt. %, relative to the total weight of the concentrate. Concentrates are thus obtained containing (percentages by weight):

A) from 40% to 95%, preferably from 50% to 95%, in particular from 60% to 80% of a composition comprising, relative to the total weight of A):
   1) from 10% to 35%, preferably from 25% to 35%, more preferably from 30% to 35% of polybutene-1;
   2) from 90% to 65%, preferably from 75% to 65%, more preferably from 70% to 65% of polypropylene;

B) from 5% to 60%, preferably from 5% to 50%, in particular from 20% to 40% of one or more additives.

The aforesaid percentages of A) and B) refer of course to the total weight of the concentrate.

The concentrates of the present invention can be prepared by mixing the aforesaid components, employing processes and equipment that are well known in the field of processing of olefinic polymers. In particular, there are essentially two processes that are most used for the processing of polyolefin-based masterbatches:

1) dry blend;
2) extrusion.

1) The dry blend process, consisting essentially of dry mixing, after grinding if required, of the components in the blend, envisages the use of equipment such as:
   a) mills (with cutters or with disks, with cryogenic plant or at room temperature);
   b) screens;
   c) mixers (continuous or turbomixers).

2) The extrusion process consists of fluid-phase homogenization of the components of the blend. This process may or may not envisage a dry blend stage prior to the extrusion stage proper, depending on whether subsequent processing is as powders or granules, respectively. The various stages and equipment of the process are as follows:
   a) dry blend if required;
   b) feed (using gravimetric or volumetric dispensers);
   c) extrusion (using single-screw or twin-screw extruders; the latter can be co-rotating of the slow or fast type, or counter-rotating);
   d) cooling (in water, or on cooled belts);
   e) granulation (by a cutting unit, or with cutting in the extruder head);
   f) homogenization (in homogenizing silos) and packing.

The concentrates of the present invention can be blended advantageously with crystalline homopolymers and copolymers of propylene. In particular, preferred examples of olefinic polymers with which the concentrates of the present invention can be blended are:

crystalline homopolymers of propylene, in particular isotactic homopolymers, having an isotacticity index preferably above 93%;

crystalline polymers of propylene with ethylene and/or C$_4$-C$_{10}$ alpha-olefins, in which the total content of comonomers (for example 1-butene, 1-hexene, 4-methyl-1-pentene and 1-octene) is between 0.05 and 20 wt. % relative to the weight of the copolymer;

polymers and copolymers of ethylene, such as LDPE, HDPE, LLDPE;

elastomeric copolymers of ethylene with propylene and/or C$_4$-C$_{10}$ alpha-olefins, possibly containing reduced quantities of a diene (preferably from 1 to 10 wt. %), such as 1,4-hexadiene, 1,5-hexadiene and ethylidene-1-norbornene;

elastomeric thermoplastic compositions comprising a crystalline homopolymer or copolymer of propylene as described above, and an elastomeric portion containing an elastomeric copolymer of ethylene as described above, typically prepared according to known methods, by mixing the components in the molten state or by sequential polymerization, and generally containing the aforesaid elastomeric portion in quantities from 5 to 80 wt. %;

homopolymers and copolymers of butene-1 as described previously in connection with the carrier of the concentrates of the present invention, possibly blended with the elastomeric thermoplastic compositions described above.

In this way a polyolefinic composition is obtained containing the additives originally present in the concentrate, and ready for the processing required for obtaining the finished (manufactured) products.

The methods of blending can be the same as described previously for blending the components of the concentrates of the present invention.

The invention will now be described in detail with reference to a specific, non-limiting example and referring to the appended diagram (FIG. 1) which is a graph of the variation of the dispersion index of the pigment in the polymer bulk with increasing proportion of polybutene-1 in the binary mixture.

The invention will be described in detail with reference to a test that evaluates the dispersion of the pigment in the carrier whenever the final masterbatch (carrier with added pigment) is then to be used for colouring polypropylene during its conversion to fibre. In fact, as noted earlier among the methods of processing of polypropylene, that relating to its conversion to fibres has proved to be the most critical with respect to the colouring stage and therefore this test involves spinning of the polypropylene included in the masterbatch.

The binary mixture was prepared using a polybutene-1 having a melt flow rate (MFR) equal to 200 g/10 min (measured at 189° C./2.16 kg) and a melting point (MP) of 124-125° C. The polybutene-1 was added in amounts between 0 and 35% to a homopolymeric polypropylene with MFR of 25 g/10 min (measured according to ASTM D 1238 L) and a content of fraction soluble in xylene at room temperature of 3.5 wt. %, and the binary mixture obtained each time constituted 80% of the masterbatch, the rest being pigment.

The pigment used is CINQUASIA Red B RT-790-D, a pigment in the class of quinacridone colorants and known to be very difficult to disaggregate and disperse.

The dispersion and dispersibility of the pigment in the binary mixture obtained were then evaluated with the so-called "Filter test". This is based on monitoring the variation in pressure produced by the fluid mass on a filter located downstream from the extrusion head during the polymer spinning process. In particular, the increase in pressure, relative to a neutral resin taken as reference, produced by the masterbatch or better still by the undispersed pigment that is deposited on the filter, is measured. In practice, the pressure is measured near the filter before and after passage of the masterbatch through the extrusion-spinning equipment, during passage of the neutral reference resin through the same.

Using this test, it is possible to evaluate the carrier by calculating the following index:

$$I=(P_{final}-P_{initial})/g$$

where $P_{initial}$ represents the pressure measured at the end of passage of the neutral reference resin, but before introduction of the masterbatch, $P_{final}$ represents the pressure after passage of the masterbatch, measured during the next passage of the neutral reference resin, g represents the grams of pigment filtered and I is the index of dispersion, in which:

Index I≦0.25 excellent product for fibres;
Index 0.25<I≦0.35 good product for fibres;
Index 0.35<I≦0.5 product for fibres to be used following evaluation;
Index I>0.5 product not recommended for fibres.

Various masterbatches were prepared with varying amounts of polybutene-1 in the carrier: respectively 0, 10, 15, 20, 25, 25, 35% based on the total quantity of carrier.

The stages and the measurements that will now be described were therefore effected six times, corresponding to the various masterbatches containing carriers with increasing amounts of polybutene-1 (as stated in the preceding paragraph), and the value of I was calculated each time.

Thus, a hopper was charged with 700 g of masterbatch (carrier plus pigment) previously extruded and in granules and containing 140 g of pigment. Then a supporting resin was added, consisting of the same resin used as neutral reference, until 1 kg of material was obtained, i.e. in an amount of 300 g. This resin has the function of diluting the masterbatch, which otherwise, especially for other concentrations of pigment in the masterbatch itself, would produce an excessive loading on the filter. The polymeric composition thus obtained was extruded in an extruder at 45 rpm applying a temperature in the various extrusion zones of 240° C., 270° C., 280° C. Then the resin discharged downstream from the extruder was made to pass through a 20 μm filter. The neutral reference resin consisted in this case of low-density polyethylene (LDPE) having a melt flow rate of 2 g/10 min measured according to ASTM 1238 condition E.

The results shown in the following table were obtained:

| % PB-1 in carrier | I (bar G) |
|---|---|
| 0 | 0.77 |
| 10 | 0.52 |
| 15 | 0.34 |
| 20 | 0.45 |
| 25 | 0.27 |
| 35 | 0.21 |

It is clear from the results that the masterbatch containing 100% polypropylene in the carrier is not suitable for colouring fibres: the pigment does not disperse in the carrier and clogs the filter, causing a considerable increase in pressure.

The introduction of even a small percentage of polybutene-1 in the carrier (15%) produces a considerable reduction in pressure on the filter, leading to a product that can be regarded as being of good quality.

The variation of the dispersion index I is shown in the accompanying diagram (FIG. 1). This graph clearly shows how increasing the percentage of polybutene-1 in the carrier improves the dispersion of the pigment in the masterbatch, until—for percentages of 25-35%—a product is reached that can be regarded as excellent for the colouring of polymeric fibres.

On the basis of the course of the curve shown in the appended diagram, above 35% we can expect a dispersion index that tends towards an almost constant value, which does not justify increasing the amount of polybutene-1 in the carrier mixture.

Therefore a preferred form of the present invention envisages the use of a percentage of polybutene-1 in the carrier equal to 25-35%, preferably equal to 30%, in the spinning of polypropylene.

Without wishing to be linked to a theory, it is assumed that this surprising result is due on the one hand to the rheological characteristics of polybutene-1, the high fluidity of which favours the dispersion of the pigment in the carrier, and on the other hand to its influence on the process of crystallization of polypropylene (with which polybutene-1 displays perfect rheological and crystalline miscibility), which leads to an increase in the amorphous fraction and therefore of sites for insertion of pigment, which is thus better incorporated in the fluid mass.

Therefore the use of this binary mixture permits excellent dispersion and dispersibility of the pigment. Furthermore, in view of the characteristic of creep resistance of polybutene-1 in a binary mixture, this material is preferred over other polyolefins with similar viscosity, but which might lead to breakages during the process of stretching of the fibres.

The example given above is for evaluating a masterbatch intended for bulk colouring of polypropylene, during spinning of the latter, but the concentrates of the present invention can of course be used advantageously for the addition of additives to other polyolefins in the course of processing operations that are known to a person skilled in the art.

The invention claimed is:

1. A concentrate comprising (percentages by weight):
   A) from 40% to 95% of a composition relative to the total weight of A) comprising:
      1) from 25% to 35% of polybutene-1 having a melting point of crystalline form 2 from 81 to 109° C. selected from homopolymers of butene-1 or copolymers of butene-1 with up to 30 mol % of olefinic comonomers selected from ethylene and alpha-olefins containing from 5 to 8 carbon atoms, wherein the polybutene-1 comprises a melt flow rate ranging from 100 to 1000 g/10 min., measured at 190° C. at 2.16 kg;
      2) from 75% to 65% of polypropylene selected from isotactic crystalline homopolymers of propylene or copolymers of propylene with at least one of ethylene and $CH_2=CHR$ alpha-olefins in which R is an alkyl radical with 2-8 carbon atoms, containing more than 85 wt % propylene; and
   B) from 5% to 60% of one or more additives.

2. The concentrate according to claim 1, wherein the concentrate comprises from 50% to 95% by weight of the composition relative to the total weight of A).

3. The concentrate according to claim 1, wherein the concentrate comprises from 60% to 80% by weight of the composition relative to the total weight of A).

4. The concentrate according to claim 1, wherein the composition comprises from 30% to 35% by weight of polybutene-1.

5. The concentrate according to claim 1, wherein the composition comprises from 70% to 65% by weight of polypropylene.

6. The concentrate according to claim 1, wherein the composition comprises from 5% to 50% by weight of one or more additives.

7. The concentrate according to claim 1, wherein the composition comprises from 20% to 40% by weight of one or more additives.

8. The concentrate according to claim 1, wherein the polybutene-1 is a linear, semicrystalline and highly isotactic homopolymer.

9. The concentrate according to claim 1, wherein the polypropylene is isotactic polypropylene having an index of isotacticity greater than or equal to 90.

10. The concentrate according to claim 1 for dispersing one or more additives in at least one polyolefin.

11. Polyolefinic articles comprising the concentrate of claim 1, wherein the concentrate is blended with at least one polyolefin and then processed.

12. Coloured polypropylene fibres comprising the concentrate of claim 1, wherein the concentrate is blended with at least one polyolefin and then spun.

13. A polyolefinic composition for preparing concentrates of additives, comprising (percentages by weight):
   a) from 25% to 35% of polybutene-1 having a melting point of crystalline form 2 from 81 to 109° C. selected from homopolymers of butene-1 or copolymers of butene-1 with up to 30 mol % of olefinic comonomers selected from ethylene and alpha-olefins containing from 5 to 8 carbon atoms, the polybutene-1 comprising a melt flow rate ranging from 100 to 1000 g/10 min., measured at 190° C. at 2.16 kg; and
   b) from less than 75% to 65% of polypropylene selected from isotactic crystalline homopolymers of propylene or copolymers of propylene with at least one of ethylene and $CH_2$=CHR alpha-olefins in which R is an alkyl radical with 2-8 carbon atoms, containing more than 85 wt % propylene.

14. The polyolefinic composition of claim 13 comprising from 30% to 35% by weight of polybutene-1.

15. The polyolefinic composition of claim 13 comprising from 70% to 65% by weight of polypropylene.

16. The concentrate of claim 1, wherein the polybutene-1 comprises a melt flow rate ranging from 100 to 400 g/10 min., measured at 190° C. at 2.16 kg.

17. The concentrate of claim 1, wherein the additives are selected from at least one pigment, colorant, or mixture thereof.

18. The concentrate of claim 1 wherein the polypropylene is a propylene homopolymer, and the polybutene is a homopolymer.

19. The concentrate of claim 1 wherein the polypropylene is a propylene copolymer with ethylene and at least one of $CH_2$=CHR alpha-olefins in which R is an alkyl radical with 2-8 carbon atoms, and the polybutene is a homopolymer.

20. The concentrate of claim 1 wherein the polypropylene is a homopolymer, and the polybutene is a copolymer containing up to 30 mol % of comonomers selected from ethylene and alpha olefins containing from 5 to 8 carbon atoms.

21. The concentrate of claim 1 wherein the polypropylene is a propylene copolymer with ethylene and at least one of $CH_2$=CHR alpha-olefins in which R is an alkyl radical with 2-8 carbon atoms, and the polybutene is a copolymer containing up to 30 mol % of comonomers selected from ethylene and alpha olefins containing from 5 to 8 carbon atoms.

22. The concentrate of claim 1, wherein the melt flow rate of the polybutene-1 ranges from 200 to 1000 g/10 min., measured at 190° C. at 2.16 kg.

* * * * *